Sept. 8, 1942.   L. J. GILG   2,294,978
ROTARY SAW APPARATUS
Filed July 14, 1941

INVENTOR
LOUIS J. GILG
BY
Wheeler, Wheeler & Wheeler
ATTORNEYS.

Patented Sept. 8, 1942

2,294,978

UNITED STATES PATENT OFFICE 2,294,978

ROTARY SAW APPARATUS

Louis J. Gilg, Milwaukee, Wis., assignor to The Journal Company, Milwaukee, Wis., a corporation of Wisconsin Application July 14, 1941, Serial No. 402,260

6 Claims. (Cl. 29—69)

This invention relates to improvements in rotary saw apparatus.

It is the object of the invention to protect users of rotary saws from being injured by flying particles severed from the work by the teeth of the saw. The type of saw upon which the invention has particular utility is one used for the trimming of blocks of lead or lead composition used as spacers in composing room forms in printing establishments. The amount of metal which it is usually required to trim from the face of a metal spacer block is usually less than, or not much greater than, the thickness of the saw tooth itself and, consequently, the operation is a trimming rather than a conventional sawing operation.

A high degree of accuracy is required and the blocks to be trimmed are sometimes relatively small. To prevent the blocks from tilting during the trimming operation, it is the practice to provide the saw table with a slot just wide enough to receive the saw. Notwithstanding the use of guards and all other precautions to protect the operator from flying particles of metal, injury to the operator's eyes has been common and it is the primary object of the present invention virtually to eliminate injuries from this source without in any way impairing the free use of the equipment or impairing its accuracy.

In the drawing.

Like parts are identified by the same reference characters throughout the several views.

The saw table 1 is provided with the usual slot at 2 for a rotary saw 3, power driven by means of belt 4 from motor 5. The guard 6 which conventionally covers the saw and the slotted portion of the table is only fragmentarily illustrated.

Figure 1:
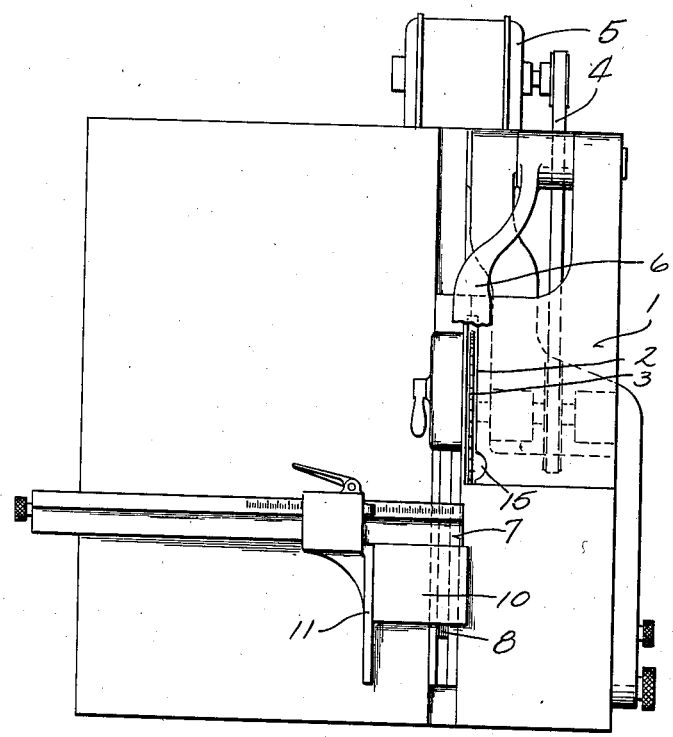
Fig. 1 is a plan view of a saw trimmer embodying this invention, a portion of the saw guard being broken away to expose the saw and the table structure underlying the guard.

Movable to and from the saw in a plane generally parallel to the plane of the saw is carriage 7 to which clamp member 8 holds the work-piece 10 in a position determined by the adjustable gage member 11. As clearly shown in Fig. 1, only the extreme end portion of the work-piece 10 would ordinarily project into the path of rotation of the saw. When engaged by the saw, the work-piece 10 is supported by the table immediately adjacent the slot 2 in which the saw operates.

Figure 2:
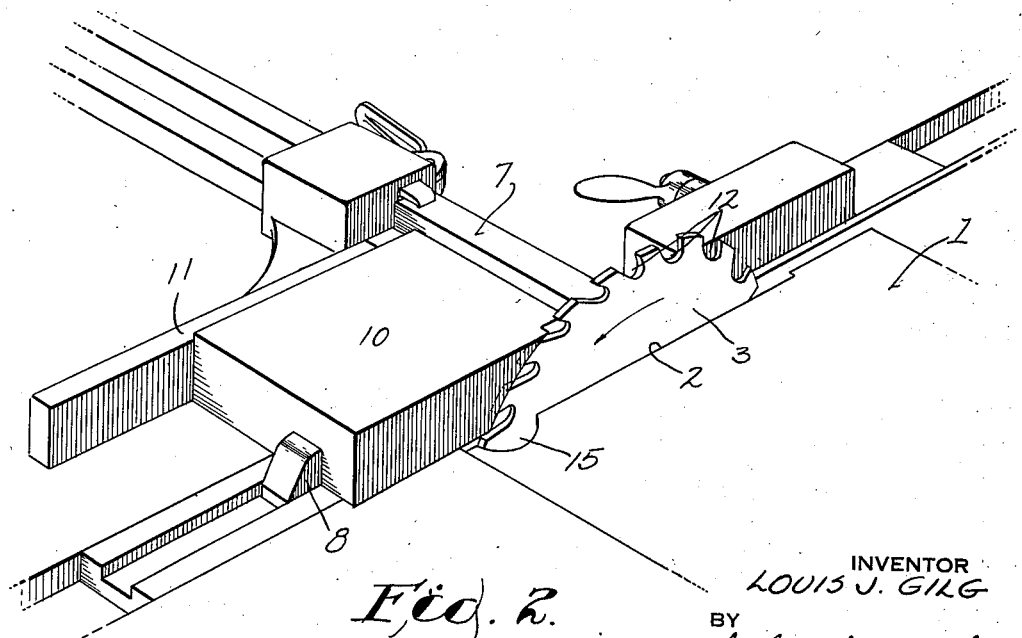
Fig. 2 is an enlarged detail view in perspective showing the saw, the work and the table and illustrating the nature of the improvement made by the present invention.

The direction of rotation of the saw is ordinarily that indicated by the arrow in Fig. 2. The notches 12 which form the saw teeth are ordinarily slightly inclined in the direction of saw rotation so that the several teeth are undercut. The tendency is for all metal cut from the work by the saw teeth to be propelled by the teeth through the slot in the table.

I have found, however, that when the saw is rotated at the speeds commonly used, some of the metal trimmed from the block 10 by the teeth is hurled toward the table with sufficient lateral movement so that it strikes the face of the table instead of being propelled through the slot 2 therein. More surprising is the fact that much of the metal which strikes the surface is metal which has made one or more circuits with the rotary saw, passing beneath the table and issuing again with the saw teeth from the slot 2 and travelling beneath the guard to the vicinity of the work before taking sufficient lateral departure from the saw to be impelled against the table. The ultimate impact of such particles with the table may to some degree be attributable to the presence of the guard, the presence of which is required for protection from the saw itself, but which by confining and guiding the flying metal may actually direct it onto the table surface.

Particles striking the table, particularly if such particles be of metal, rebound high into the air and the operator using the conventional saw trimming device is surrounded by particles of flying metal cut from the work, with constant danger and frequent injury to his eyes.

I have found that practically all of this flying metal can be eliminated by providing the table 1 with a notch or opening 15 which is preferably semi-circular in form and located immediately adjacent the point where the periphery of the saw leaving the work passes downwardly through the table. While it is not necessary that the opening 15 be circular in form, this shape of opening is to be preferred because it provides a maximum table surface for the support of the work while still providing adequate opening for complete disposal of particles of metal trimmed from the work. The opening should be so located as to extend from a position near the roots of the teeth of the saw to a position near or just beyond the periphery of the saw.

When such an opening is provided, the normal use of the saw remains unchanged and its accuracy unimpaired, but the operator is protected by substantially complete elimination of flying particles.

I claim:

1. The combination with a rotary saw provided with peripheral teeth, of a saw table provided with a slot within which the saw is rotatable, said table having an opening through the table communicating with said slot adjacent the path of movement of the teeth of the saw at the point where such teeth enter the slot and constituting a delivery port for the escape of work particles propelled by the saw teeth.

2. The combination with a circular saw having peripheral teeth, of a saw table having a slot through which the peripheral portion of the saw extends, said table being provided with a notch opening into said slot and having a marginal surface generally rounded about said notch, said notch being located immediately adjacent that portion of the slot where teeth of the saw reenter the slot to pass through the table.

3. The combination with a circular saw having peripheral teeth, of a table through which a peripheral portion of the saw projects, said table being slotted to receive the saw and provided with a notch opening through the table and into the slot from a point adjacent the roots of the teeth to a point adjacent the periphery of the saw.

4. A saw trimmer comprising the combination with a rotatable and peripherally toothed saw, of means for guiding work for movement substantially parallel to the saw for the trimming of such work by the saw teeth, and a table for the support of work so guided, said table having a slot in which the saw is closely confined and being provided with a generally circular notch opening into the slot adjacent the point where the teeth of the saw reenter the slot to pass through the table, said notch extending from a point near the roots of said teeth to a point just beyond the saw periphery and being of such limited extent that the table provides adequate support for the work while said notch is nevertheless sufficiently large to receive material trimmed from the work by the saw to pass such material through the table without causing it to rebound from the surface thereof.

5. A saw trimmer comprising the combination with a rotatable and peripherally toothed saw, of a table having a slot in which the saw is closely confined, carriage means movable upon the table in general parallelism with the saw and provided with work holding mechanism whereby work may be positioned on the carriage for movement to the saw, a guard housing peripherally enclosing a portion of the saw above the table, said table being provided with an opening constituting an enlargement of the saw slot confined to the immediate proximity of the point where the teeth of the saw reenter the slot to pass through the table, said opening having dimensions such as to extend from a point near the roots of the teeth of the saw to a point near the periphery of the saw and being sufficiently large to receive material travelling with the saw through said guard housing and projected tangentially and laterally from the saw, whereby such material is passed through the table without rebound from the surface thereof.

6. The structure defined in claim 1 in further combination with means for guiding work for movement substantially parallel to the saw for the trimming of such work by the saw teeth.

LOUIS J. GILG.